No. 784,893. PATENTED MAR. 14, 1905.
C. H. SCHICK.
LAWN TRIMMER.
APPLICATION FILED JULY 26, 1904.
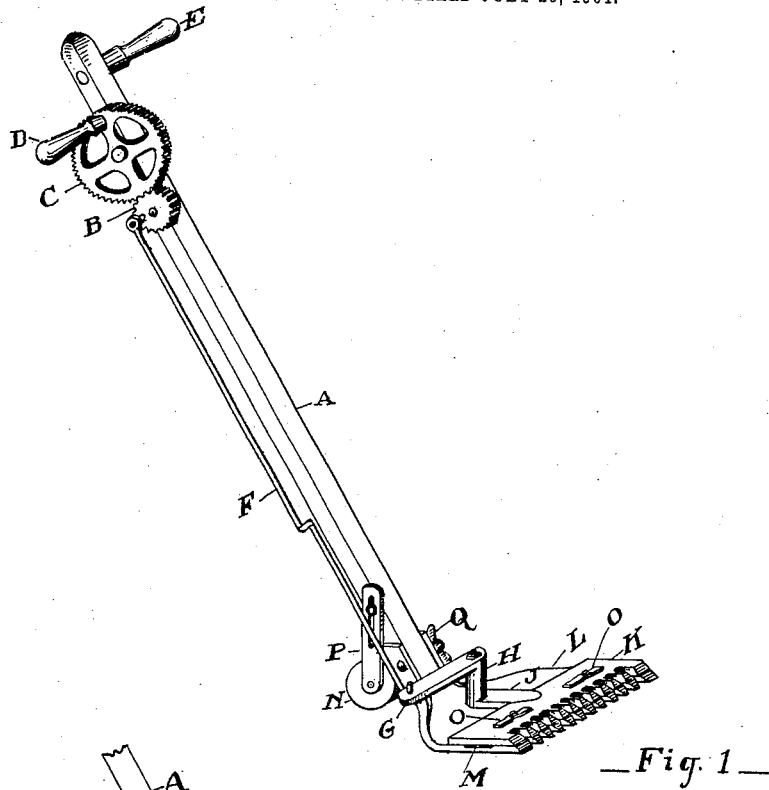
_Fig. 1_
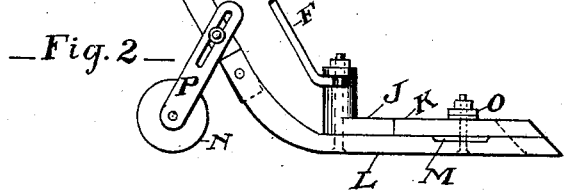
_Fig. 2_
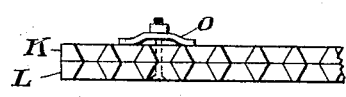
_Fig. 3_
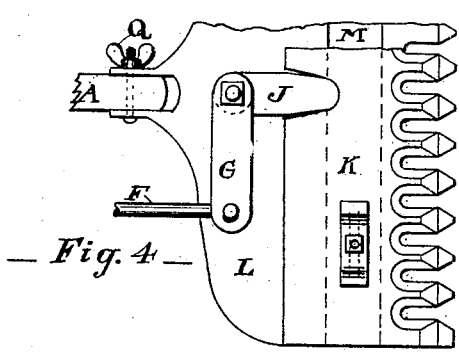
_Fig. 4_
Witnesses:
G. F. Downing
S. G. Nottingham
Inventor:
C. H. Schick
by H. A. Seymour
Atty.

No. 784,893. Patented March 14, 1905.

UNITED STATES PATENT OFFICE.

CHARLS H. SCHICK, OF BURLINGTON, IOWA.

LAWN-TRIMMER.

SPECIFICATION forming part of Letters Patent No. 784,893, dated March 14, 1905.

Application filed July 26, 1904. Serial No. 218,278.

*To all whom it may concern:*

Be it known that I, CHARLS H. SCHICK, a resident of Burlington, in the county of Des Moines and State of Iowa, have invented certain new and useful Improvements in Lawn-Trimmers; and I do hereby declare the following to be a full, clear, and exact description of the invention, such as will enable others skilled in the art to which it appertains to make and use the same.

My invention relates to an improved lawn-trimmer, the object of the invention being to provide an improved device of this character enabling the easy cutting of grass along walls, around trees, at the edge of walks, fences, and the like, and the device is of simple and durable construction, is easily operated, and of comparatively small cost to manufacture; and it consists in certain novel features of construction and combinations and arrangements of parts, as will be more fully hereinafter described, and pointed out in the claims.

In the accompanying drawings, Figure 1 is a perspective view illustrating my improvements. Fig. 2 is a broken view in side elevation. Fig. 3 is a broken forward edge view, and Fig. 4 is a broken plan view.

L represents the base-plate of my improved apparatus, having an upward contracted extension at its rear end, bifurcated to receive a pole or handle A, and a bolt is passed through alined openings in the extension and pole A and has a thumb-nut Q thereon to clamp the parts together and permit the pole to be adjusted to any angle with relation to the base-plate L.

The base-plate L is provided at its forward edge with a series of beveled teeth, which register with the teeth of a sickle-plate K on top of plate L, and the teeth of the sickle and plate L are uniformly beveled at their outer ends.

Sickle-plate K is made with elongated slots to receive bolts which are passed through bow-springs O and secured by nuts. The springs O bear against the upper face of the sickle-plate K and serve to hold the same in close contact with plate L and compel the perfect action of the cutting-teeth.

Pivotally secured on a bolt at the rear portion of plate L is a bell-crank lever H, one member J of which has a rounded end and projects into a notch or recess in the inner edge of sickle K to reciprocate the sickle when the lever is operated. The other member G of lever H is connected by a rod F with a crank-pin on one side of a small pinion B, mounted to rotate on a pin secured to pole A and driven by a larger gear C above the same, and said drive-gear is operated by a handhold D, and a handhold E is secured to the upper end of pole on its side opposite to the gears.

To facilitate the easy movement of the device over the ground, a slotted bracket P is adjustably secured to plate A by a bolt and carries a roller N to run along the ground, and this bracket can be adjusted to suit any condition.

The operation is as follows: The operator grasps handhold E with his left hand and handhold D with his right, and as he pushes the trimmer over the ground he turns gear C, transmitting motion to pinion B and through the medium of rod F and bell-crank lever H reciprocates sickle K to cut the grass which enters between the teeth of the sickle and plate L.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a lawn-trimmer, the combination with a toothed plate, of a sickle mounted to reciprocate thereon, a bell-crank lever pivotally mounted on said plate and engaging the sickle, a pole adjustably secured to said plate, and gearing on said pole to operate the bell-crank lever.

2. In a lawn-trimmer, the combination with a toothed plate, of a sickle on said plate mounted to reciprocate, a bell-crank lever pivotally mounted on the toothed plate to reciprocate the sickle, a pole adjustably secured to the toothed plate, gearing on the pole, and a rod connecting said gearing with the bell-crank lever.

3. In a lawn-trimmer, the combination with a toothed plate, and a pole pivotally secured thereto and adapted to be secured at any angle, of a reciprocating sickle on said toothed plate, a bell-crank lever pivotally mounted on said toothed plate having one member projecting into a notch or recess in the sickle, gearing on the pole, and a rod connecting said gearing with the other member of the bell-crank lever.

In testimony whereof I have signed this specification in the presence of two subscribing witnesses.

CHARLS H. SCHICK.

Witnesses:
 CHAS. C. CLARK,
 MARY FAWCETT.